US012666279B1

(12) United States Patent　　　　　(10) Patent No.: US 12,666,279 B1

Krishna Moorthy et al.　　　　　　　(45) Date of Patent: Jun. 23, 2026

(54) SYSTEM TO MANAGE WIRELESS MESH NETWORK DEVICES

(71) Applicant: AMAZON TECHNOLOGIES, INC., Seattle, WA (US)

(72) Inventors: Aswath Krishnan Krishna Moorthy, San Francisco, CA (US); Igor Wilbert, Porto Alegre (BR); Anthony M. Requist, Steamboat Springs, CO (US); Eun Sun Chu, Lewisville, TX (US); Shahrukh Shaheen Raheem, Dublin, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 462 days.

(21) Appl. No.: 18/470,190

(22) Filed: Sep. 19, 2023

(51) Int. Cl.
　　H04W 24/02　　　(2009.01)
　　H04L 41/0806　　(2022.01)
　　H04W 84/18　　　(2009.01)
(52) U.S. Cl.
　　CPC ......... H04W 24/02 (2013.01); H04L 41/0806 (2013.01); H04W 84/18 (2013.01)
(58) Field of Classification Search
　　CPC .... H04W 24/02; H04W 84/18; H04L 41/0806
　　USPC ........................................................ 370/338
　　See application file for complete search history.

(56) References Cited

U.S. PATENT DOCUMENTS 7,920,531 B2 * 4/2011 Gupta ..................... H04L 41/00
　　　　　　　　　　　　　　　　　　　　　　370/338
9,807,653 B2 * 10/2017 Chhabra ......... H04W 36/00835

10,051,493 B2 * 8/2018 Pajona .................. H04W 16/28
11,522,951 B2 * 12/2022 Baid ...................... G06F 9/5072
12,520,159 B2 * 1/2026 Senga ................... H04W 12/64
12,520,164 B2 * 1/2026 Ross ...................... H04W 16/18
12,526,646 B2 * 1/2026 Kaplan ................. H04W 16/18
2008/0008128 A1 * 1/2008 Nagarajan ............... H04L 69/40
　　　　　　　　　　　　　　　　　　　　　　370/331

(Continued)

OTHER PUBLICATIONS

"Property Management", Xfinity, 17 pgs., downloaded from the Internet on Aug. 28, 2023: URL: https://www.xfinity.com/multifamily/property-owners.

(Continued)

*Primary Examiner* — Anthony Mejia
(74) *Attorney, Agent, or Firm* — Lindauer Law, PLLC

(57)　　　　　　　　ABSTRACT

Wireless mesh network devices (WMND) are installed within a facility that may have multiple tenants, connected to a wide area network, and added to a management system. The management system may configure the WMNDs to provide network service to tenants and to network-enabled devices that remain at the facility. For example, the WMNDs may provide network access to network-enabled thermostats, lighting controls, and so forth that are part of the facility. Before move-in, WMNDs are set to a first configuration. WMNDs associated with a portion of the facility associated with a new tenant are configured with a second configuration to provide network service to the tenant. The tenant may make limited changes to the configuration of the associated facility-provided WMNDs. The tenant may add their own WMNDs to the network. Upon move-out, the facility-provided WMNDs remain in place and may be returned to the first configuration.

20 Claims, 10 Drawing Sheets

(56) References Cited

U.S. PATENT DOCUMENTS

| | | | | |
|---|---|---|---|---|
| 2009/0147702 A1* | 6/2009 | Buddhikot | .............. | H04L 67/34 |
| | | | | 370/255 |
| 2015/0043530 A1* | 2/2015 | Bharghavan | ........... | H04W 8/02 |
| | | | | 370/331 |
| 2015/0081837 A1* | 3/2015 | Bernier | ................... | H04W 4/80 |
| | | | | 709/217 |
| 2016/0014818 A1* | 1/2016 | Reitsma | ............... | H04W 76/50 |
| | | | | 370/254 |
| 2016/0100440 A1* | 4/2016 | Emord | ................. | H04W 48/20 |
| | | | | 370/329 |
| 2016/0134691 A1* | 5/2016 | Law | ........................ | H04W 4/70 |
| | | | | 370/338 |
| 2016/0219050 A1* | 7/2016 | Zou | ....................... | H04W 12/04 |
| 2017/0347388 A1* | 11/2017 | Cai | ....................... | H04W 76/15 |
| 2018/0063758 A1* | 3/2018 | Velu | ...................... | H04L 5/0035 |
| 2019/0104422 A1* | 4/2019 | Chiang | ................. | H04W 48/08 |
| 2019/0116087 A1* | 4/2019 | Hiller | ...................... | H04W 4/70 |
| 2019/0116493 A1* | 4/2019 | Cyril | ..................... | H04W 12/06 |
| 2020/0064797 A1* | 2/2020 | Hannon | ................ | H04L 63/104 |
| 2020/0228621 A1* | 7/2020 | Gamroth | ................ | H04W 4/33 |
| 2021/0266989 A1* | 8/2021 | Rooney | ................. | H04W 24/02 |
| 2022/0353149 A1* | 11/2022 | Zhang | .................... | H04L 45/04 |
| 2023/0025898 A1* | 1/2023 | Kaplan | .............. | H04W 12/069 |
| 2025/0063467 A1* | 2/2025 | Zebrick | .............. | H04W 40/248 |
| 2025/0373864 A1* | 12/2025 | Bates | ................. | H04N 21/2143 |

OTHER PUBLICATIONS

"Smart communities make smart business sense", Property Automation with IoT, Cox, 5 pgs., downloaded from the Internet on Aug. 28, 2023: URL: https://www.cox.com/residential/mdu-community/property-automation-iot.html.

* cited by examiner

300

NETWORK OBJECT DATA 250

| ATTRIBUTE 302 | DESCRIPTION 304 |
|---|---|
| network_id | specifies a particular network |
| portion_id | specifies a particular apartment |
| user_id | specifies a particular user |
| activation_date | start date of service |
| deactivation_date | end date of service |
| activation_email | email address associated with service |
| activation_name | name of user associated with service |
| mode | current mode of the network object |
| created | date/time network object created |
| updated | date/time last update |
| deleted | date/time record deleted |
| ... | ... |

NETWORK OBJECT MODE DATA 310

| MODE 312 | DESCRIPTION 314 |
|---|---|
| pending activation | network object has been created |
| pending transfer | activation date reached, transfer initiated |
| owned | tenant has accepted network transfer |
| deactivated | tenant access removed |
| ... | ... |

TENANT REGISTRATION DATA 260

| ATTRIBUTE 316 | DESCRIPTION 318 |
|---|---|
| user_id | specifies a particular user |
| billing_address | billing address |
| payment_method | payment method |
| ... | ... |
|  |  |

FIG. 3

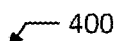
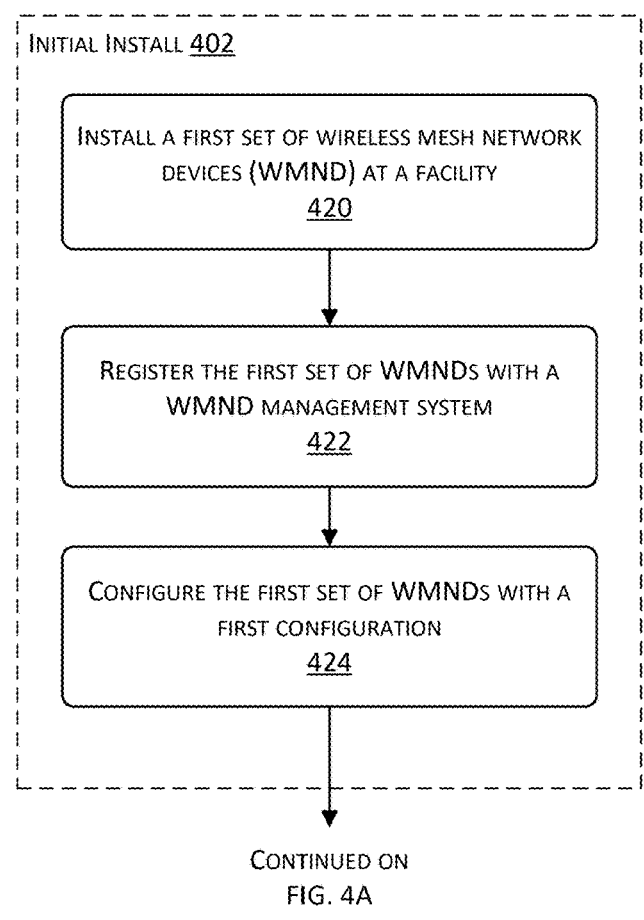
INITIAL INSTALL 402
INSTALL A FIRST SET OF WIRELESS MESH NETWORK DEVICES (WMND) AT A FACILITY
420
REGISTER THE FIRST SET OF WMNDs WITH A WMND MANAGEMENT SYSTEM
422
CONFIGURE THE FIRST SET OF WMNDs WITH A FIRST CONFIGURATION
424
CONTINUED ON
FIG. 4A
FIG. 4A 400
(CONTINUED)

FROM FIG. 4A

TENANT MOVE-IN 404

RECEIVE A FIRST SERVICE CHANGE REQUEST INDICATIVE OF INITIATING COMMUNICATION SERVICE AT A FIRST PORTION OF THE FACILITY FOR A FIRST TENANT 440

DETERMINE TENANT DATA ASSOCIATED WITH THE FIRST TENANT 442

DETERMINE A FIRST SUBSET OF THE FIRST SET OF WMNDs THAT ARE ASSOCIATED WITH THE FIRST PORTION OF THE FACILITY 444

ASSOCIATE THE FIRST SUBSET WITH THE TENANT DATA 446

CONFIGURE THE FIRST SUBSET WITH A SECOND CONFIGURATION 448

SEND ACCESS DATA TO A TENANT COMPUTING DEVICE ASSOCIATED WITH THE FIRST TENANT 450

RECEIVE, FROM THE TENANT COMPUTING DEVICE, ACCEPTANCE DATA THAT IS BASED AT LEAST IN PART ON THE ACCESS DATA 452

CONFIGURE THE FIRST SUBSET TO A THIRD CONFIGURATION 454

RECEIVE, FROM THE TENANT COMPUTING DEVICE, ONE OR MORE CHANGES TO THE THIRD CONFIGURATION 456

CONFIGURE THE FIRST SUBSET BASED ON THE ONE OR MORE CHANGES 458

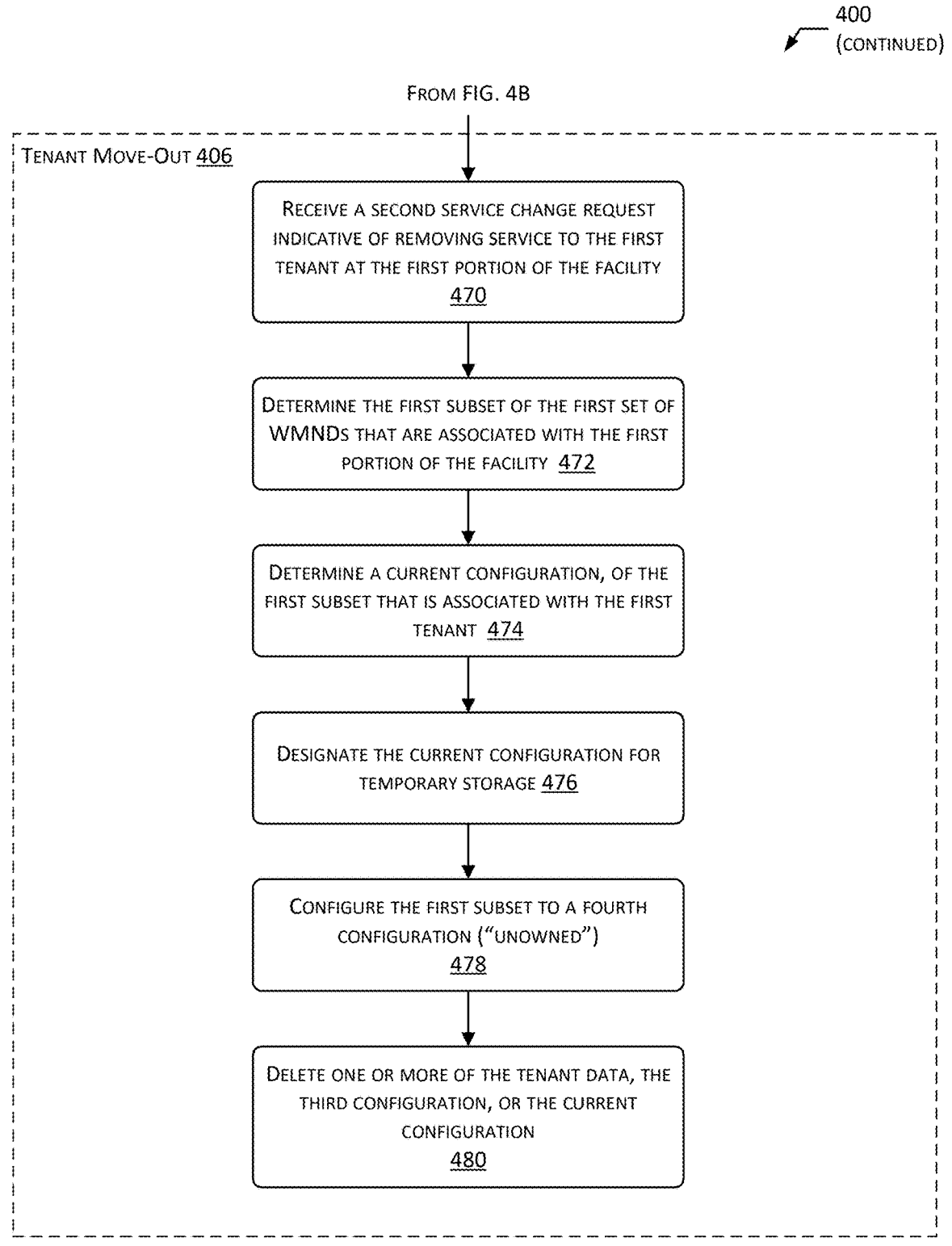

FROM FIG. 4B

TENANT MOVE-OUT 406

RECEIVE A SECOND SERVICE CHANGE REQUEST INDICATIVE OF REMOVING SERVICE TO THE FIRST TENANT AT THE FIRST PORTION OF THE FACILITY 470

DETERMINE THE FIRST SUBSET OF THE FIRST SET OF WMNDs THAT ARE ASSOCIATED WITH THE FIRST PORTION OF THE FACILITY 472

DETERMINE A CURRENT CONFIGURATION, OF THE FIRST SUBSET THAT IS ASSOCIATED WITH THE FIRST TENANT 474

DESIGNATE THE CURRENT CONFIGURATION FOR TEMPORARY STORAGE 476

CONFIGURE THE FIRST SUBSET TO A FOURTH CONFIGURATION ("UNOWNED") 478

DELETE ONE OR MORE OF THE TENANT DATA, THE THIRD CONFIGURATION, OR THE CURRENT CONFIGURATION 480

FIG. 4C 500
(CONTINUED)

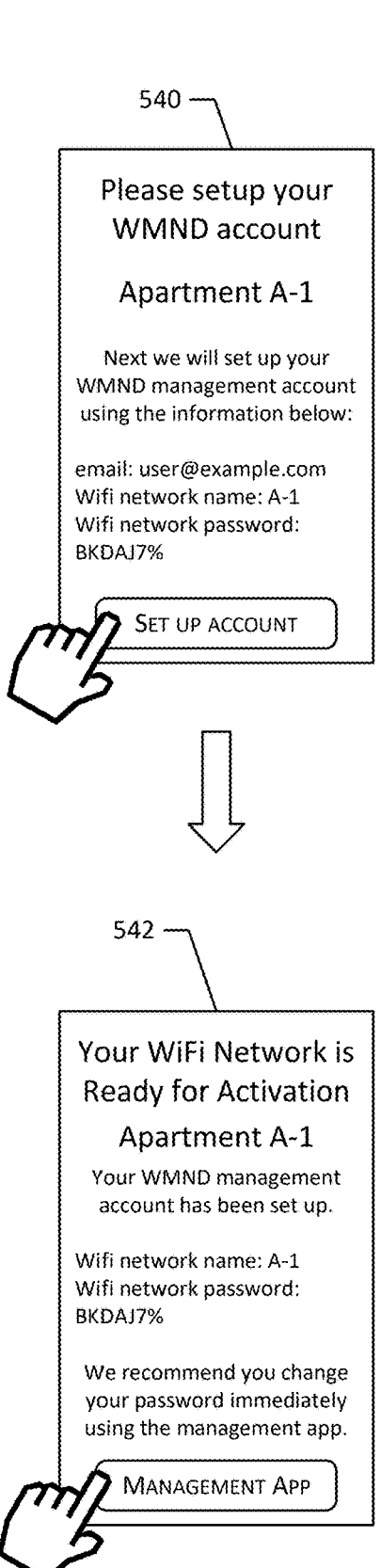

540

Please setup your WMND account

Apartment A-1

Next we will set up your WMND management account using the information below:

email: user@example.com
Wifi network name: A-1
Wifi network password: BKDAJ7%

SET UP ACCOUNT

542

Your WiFi Network is Ready for Activation

Apartment A-1

Your WMND management account has been set up.

Wifi network name: A-1
Wifi network password: BKDAJ7%

We recommend you change your password immediately using the management app.

MANAGEMENT APP

FIG. 5B 500
(CONTINUED)

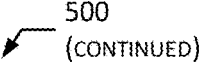

562 ⌐

Manage Your Network

WiFi Network Name

| A-1 |

WiFi network password

| BKDAJ7% |

[ SUBMIT ]

[ ADVANCED SETTINGS ]

[ FIREWALL SETTINGS ]

[ MANAGE MESH DEVICES ]

564 ⌐

Manage Your Network

WiFi Network Name

| MyHome |

WiFi network password

| GolfSwing5# |

[ SUBMIT ]

[ ADVANCED SETTINGS ]

[ FIREWALL SETTINGS ]

[ MANAGE MESH DEVICES ]

566 ⌐

Manage Your Firewall

[ PARENTAL CONTROLS ]

[ PORT FORWARDING ]

[ APPLICATION SETTINGS ]

[ ADVANCED ]

[ SUBMIT ]

568 ⌐

Manage Mesh Devices

Provided Devices

Bedroom –
Gateway eero Pro 6e

Main room – eero 6+

[ RESTART DEVICES ]

Tenant Devices

Kitchen – eero Pro

[ EDIT OWN DEVICES ]

Apartment Co.

Networks     Community settings

| Total networks | Vacant Networks | Networks with unverified owners | Networks with verified owners |
|---|---|---|---|
| 620 | 600 | 10 | 10 |

| Network Name | Apt # | Description | Network Owner Status | | Connection Status | Move-in Date | Access Code |
|---|---|---|---|---|---|---|---|
| IOT_Bldg1 | -- | West Building IOT | Verified | (change) | Connected | 8/1/23 | -- |
| A-1 | A-1 | West Building | Vacant | (assign) | Connected | 9/1/23 | MAKD36 |
| A-2 | A-2 | West Building | Vacant | (assign) | Connected | None | O595ABC |
| A-3 | A-3 | West Building | Vacant | (assign) | Connected | None | NNKN45 |
| A-4 | A-4 | West Building | Vacant | (assign) | Offline | None | PRMM66 |
| A-5 | A-5 | West Building | Occupied | (change) | Connected | None | CBBNAD3 |
| A-6 | A-6 | West Building | Vacant | (assign) | Connected | None | EIDKZN56 |
| • • • | | | | | ⋮ | ⋮ | ⋮ |

FACILITY COMPUTING DEVICE 118

604 DETAIL SECTION

602 HEADER SECTION

FIG. 6

SYSTEM TO MANAGE WIRELESS MESH NETWORK DEVICES

BACKGROUND

Network connectivity is a critical communication service for tenants of a facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 3 illustrates data associated with operation of the system, according to some implementations.

FIGS. 4A-4C illustrate a flow diagram of a process including initial installation, tenant move-in, and tenant move-out from the facility, according to some implementations.

FIGS. 5A-5C depict tenant user interfaces for various operations associated with setting up communication service within a portion of the facility, according to some implementations.

FIG. 6 depicts a facility management user interface of the system, according to one implementation.

Figure 1:
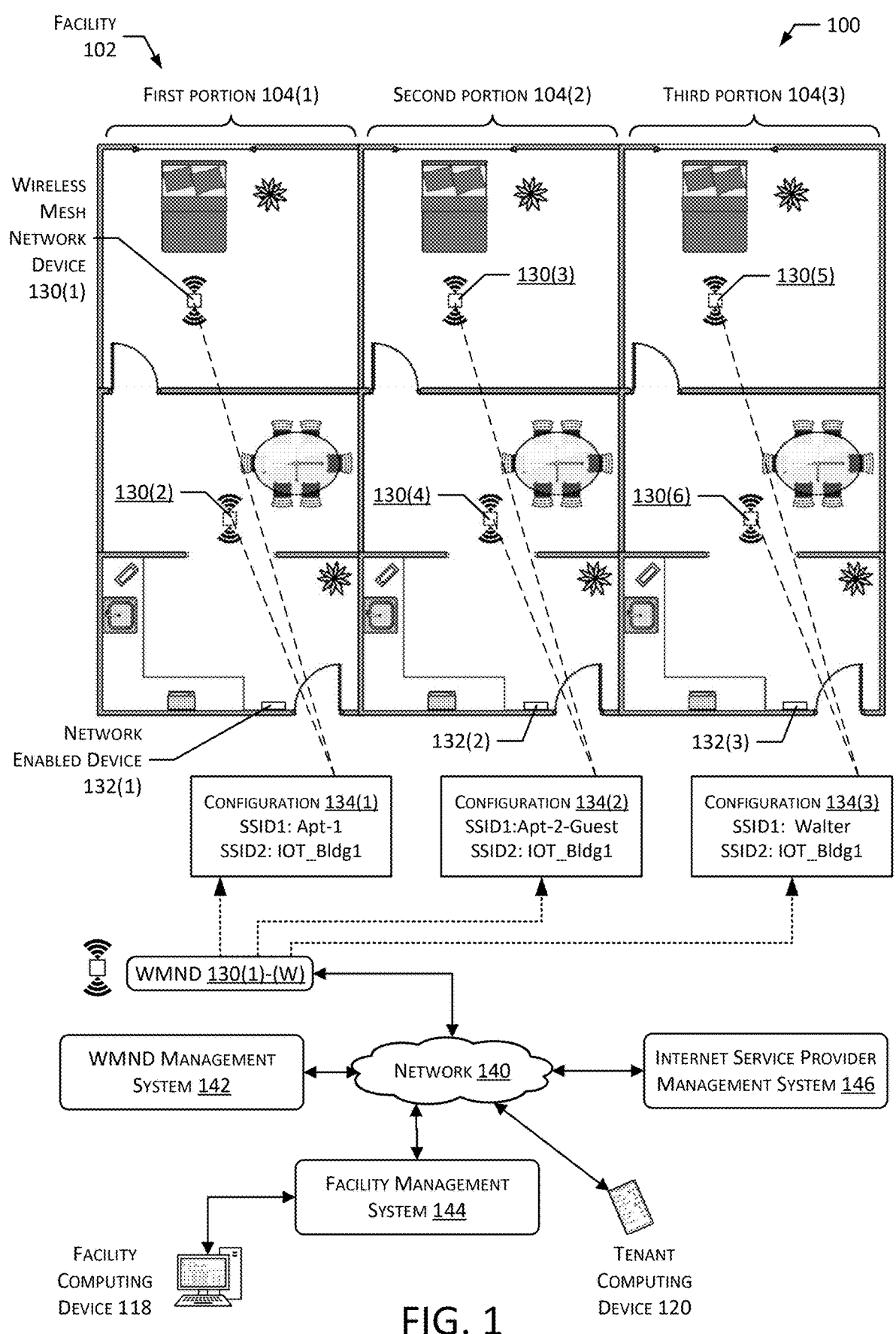
FIG. 1 illustrates a system for providing communication service via wireless mesh network devices (WMND) to tenants in a facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A facility may have various portions that are associated with tenants. For example, the facility may comprise an apartment building with numerous apartments. In another example, the facility may comprise a commercial space that is subdivided into various suites or areas. Whether a tenant is an individual or a business, the network connectivity, such as internet access, is a critical service to be provided to tenants.

Traditionally the process of providing network connectivity to a portion of a facility associated with a tenant has been complicated and required many steps. For example, traditionally a tenant would complete their rental paperwork, enter their apartment, perform either a self-installation or wait for a service technician to visit and install service. Once service is installed, the tenant would still need to physically install and configure their respective wireless networking devices. The overall process may be fraught with delays, may involve substantial technical skill, and otherwise introduces a substantial inconvenience to the tenant. Given the critical nature of network connectivity for providing services ranging from voice over internet to control of devices such as security cameras and thermostats, such delays result in a substantial adverse impact on the tenant.

Described in this disclosure are techniques and systems for providing "service left in place" (SLIP) at a facility. Wireless mesh network devices (WMNDs) are installed in a facility. The WMNDs may provide a wireless mesh network. These WMNDs in turn are connected to a wide area network connection, such as the internet. Once installed, the WMNDs may remain in the facility where they provide tenants with wireless connectivity to the wide area network, such as the internet. In addition to providing connectivity to tenants, the WMNDs may also provide connectivity to network-enabled devices, or "internet of things" (IOT) devices such as network-enabled thermostats, doorbell cameras, and so forth.

Because the WMNDs remain in place, and are connected to the wide area network, they may be reconfigured. The WMNDs are able to receive, via the network, changes to their configuration. The WMNDs may also allow for operation using two or more configurations at the same time. For example, a first configuration may provide a first wireless network having a first wireless service set identifier (SSID), first password, and so forth. Continuing the example, a second configuration may provide a second wireless network having a second wireless SSID, second password, and so forth. This flexibility allows the WMNDs to support a fast and convenient process to provide communication service such as internet access to the tenant at move-in, and remove that communication service at move-out.

The WMNDs may be managed by a WMND management system. The WMND management system may establish secure communication with the WMNDs, and provides management functions such as configuring respective WMNDs and operating them based on that configuration. The WMND management system may be in communication with other participating systems and devices. For example, the WMND management system may be in communication with an internet service provider (ISP) management system, a facility management system, a tenant computing device, and so forth. These systems may coordinate various operations to configure and operate the WMNDs associated with the facility, and in particular the portion of the facility associated with the tenant, to provide network services to a tenant at move-in and remove those services at move-out.

In one implementation, a facility management system may be used to receive electronic signatures to a rental contract associated with the tenancy of a portion of the facility, such as a particular apartment, and a specified move-in date and contact information for the tenant. The facility management system may send a message to one or more of the WMND management system or the ISP management system. Responsive to the message, tenant data may be acquired that includes information such as name, address, payment information, and so forth. At the specified move-in date, those WMNDs that are associated with the portion of the facility being rented, such as the WMNDs in a particular apartment, are operated with a configuration that awaits the tenant to connect. For example, a temporary SSID and password may be specified, and those parameters sent to the tenant.

The user may use this information to connect to the WMNDs, and complete the setup process. This setup process may include creating or confirming an account with the WMND management system, if provided by another party, agreeing to terms of service for the ISP, and so forth. At the conclusion of a successful setup process, the WMNDs associated with that portion of the facility are configured for tenant use. The tenant, using the WMND management system, may change or modify the configuration of the WMND that is associated with their tenancy. For example, the tenant may change the wireless local area network parameters such as SSID, password, change firewall parameters, and so forth. Such changes will only affect the operation of the WMND with respect to the tenant's service. Meanwhile, the WMND may also be providing communication services to other devices, such as providing the IOT network that connects IOT devices installed in the facility to the internet.

In addition to making the changes to their configuration, the tenant may also add their own compatible devices to the network. For example, the tenant may use the WMND management system to add additional tenant-owned WMNDs to the network provided by the tenant's configuration.

When the tenant moves out, the previously installed WMNDs remain with the facility, and the tenant's configuration is removed from the WMNDs associated with that portion of the facility. As needed, another configuration, such as a guest or unoccupied configuration, may be used to operate the WMNDs in the now-vacant portion of the facility.

Because these changes in configuration to the WMNDs may be performed by the WMND management system, there is no need for a technician to be physically present at the facility to install service at move-in or remove service at move-out. As a result, the delays and costs associated with such changes is eliminated.

The system also allows a tenant to transfer an existing configuration to a new tenancy. For example, a tenant who is moving from a first apartment to a second apartment may transfer their configuration from the first apartment to the second apartment. By transferring the configuration, the tenant is able to easily relocate their existing network-using devices without having to reconfigure those devices, and without having to manually duplicate the configuration. As a result, the tenant's move of their many connected devices is made substantially simpler.

If the tenant does make modifications to their network setup, the WMND management system provides a simple and secure mechanism to do so. For example, the tenant may use a simple interface to configure a custom SSID, enter their preferred password, set firewall parameters, and so forth.

By using the system and techniques described in this disclosure, stakeholders such as tenants, facility managers, and ISP managers realize substantial benefits. Delays and costs associated with delivering communication service such as internet service to a particular portion of a facility are reduced or eliminated. The requirements for a technician to be onsite for routine move-ins or move-outs are eliminated. Difficulties associated with tenant self-installation are substantially reduced or eliminated.

Illustrative System

FIG. 1 illustrates a system 100 for providing communication service such as internet service via wireless mesh network devices (WMND) 130 to tenants in a multi-tenant facility 102 ("facility"), according to some implementations. The facility 102 may be divided into portions 104 for use by different tenants. In this illustration, the facility 102 comprises a residential apartment building, and each portion comprises a different apartment. For example, a first portion 104(1) is a first apartment, a second portion 104(2) is a second apartment, and a third portion 104(3) is a third apartment. The facility 102 may comprise any number of portions 104(1)-(N). For ease of illustration and not as a limitation, three portions 104(1)-(3) are depicted here. The facility 102 may be operated by a facility manager.

In other implementations the facility 102 may be used for commercial purposes. For example, the multi-tenant facility 102 may comprise a hotel, office, light industrial, warehouse, manufacturing, and so forth.

A plurality of wireless mesh network devices (WMND) 130(1)-(W) are installed at the facility 102. In this illustration, two WMNDs 130 are installed in each apartment. For example, WMNDs 130(1)-(2) are installed within the first portion 104(1), WMNDs 130(3)-(4) are installed within the second portion 104(2), and WMNDs 130(5)-(6) are installed within the third portion 104(3). Other WMNDs 130 (not shown) may be installed in common or service areas of the facility 102. For example, WMNDs 130 may be located in hallways, common rooms, entry areas, storerooms, mechanical rooms, and so forth.

The WMNDs 130 may comprise access points, repeaters, wireless mesh access points, and so forth. The WMNDs 130 may relay data traffic from one WMND 130 to another wirelessly, forming a network. In some implementations one or more of the WMNDs 130 may be wired or physically connected to a wired network. For example, one or more WMNDs 130 may be connected via Ethernet to a local area network or a wide area network. The WMNDs 130 may be connected via a bridge, router, or other networking device that provides access to a wide area network (WAN). For example, a WMND 130 may be connected to a router that provides access to a WAN that provides internet access.

The WMNDs 130 are capable of operating based on two or more different configurations 134 at the same time. Each configuration 134 may comprise a set of parameters associated with providing a wireless network, or handling of data traffic between the wireless network and another network. For example, a configuration 134 may specify a first wireless local area network (WLAN) comprising a WiFi service set identifier (SSID), a WiFi password, network addresses, and so forth. Continuing the example, the configuration may also specify firewall settings, such as permitting inbound data traffic to be directed to a specified address on the WLAN, parental controls limiting access to certain content, and so forth. Because the WMNDs 130 may operate based on two or more different configurations 134, they may be configured to provide a first WLAN, a second WLAN, and so forth at a given time. For example, as shown in this illustration, the WMNDs 130(1)-(2) are operating using configuration 134 (1) that provides for two WLANs: a first with an SSID of "Apt-1" and a second with an SSID of "IOT_Bldg1". The other WMNDs 130 shown are also configured 134 to provide different WLANS including the second with an SSID of "IOT_Bldg1".

One or more network enabled devices 132(1)-(P) may also be installed within the facility 102. For example, the network enabled devices 132 may comprise network-enabled lighting controls, thermostats (heating ventilation and air conditioning), security systems, doorbell cameras, environmental monitoring systems, network enabled televisions, and so forth. The network enabled devices 132 may also be referred to as "internet of things" (IOT) devices. The network enabled devices 132 may be installed and operated by the facility manager. The network enabled devices 132 may be provided with access to the network via the WMNDs 130. For example, the WMNDs 130 shown in FIG. 1 are configured and operated to provide a second WLAN with an SSID of "IOT_Bldg1" for use by the network enabled devices 132.

The WMNDs 130 connect to a network 140. The configuration of the network 140 may vary depending on the needs of the facility 102 and the tenants. In one implementation, the network 140 may comprise a WAN such as the internet.

A WMND management system 142 is shown connected to the network 140. The WMND management system 142 may provide various functions such as registering new WMNDs 130 that are brought into service, de-registering WMNDs 130 that are removed from service, providing security updates to the WMNDs 130, managing the installation and operation of the configurations 134 on the WMNDs 130, and so forth. Operations provided by the WMND management system 142 are discussed in more detail with regard to FIG. 2.

A facility management system 144 is shown connected to the network 140. The facility management system 144 may be used to perform various operations associated with management of the facility 102. For example, the facility management system 144 may be used to manage contracts for the tenants to use the facility 102, coordinate service or repair requests from tenants, provide billing or other accounting functions, and so forth. As described in more detail with regard to FIG. 2, the facility management system 144 may communicate with the WMND management system 142 and other systems to initiate provisioning of communication services to the tenant at move-in, remove the provisioned services at move-out, and so forth. Managers of the facility 102 may use one or more facility computing devices 118 to access the facility management system 144. For example, a property manager at the apartment building may use their desktop computer to access the facility management system 144.

An internet service provider (ISP) management system 146 is shown connected to the network 140. The ISP management system 146 may perform operations associated with management of the network services provided by an ISP. An ISP provides communication services between the facility 102 and the internet or other WAN. The ISP management system 146 may provide functions such as permitting or denying data transfer service to particular devices, management of network security services, billing or other accounting functions, and so forth.

A tenant computing device 120 may be used to access the various functions of the systems described herein. The tenant computing device 120 may comprise a smartphone, tablet, portable computer, desktop computer, network enabled audio speaker with microphone, and so forth.

These various systems may be used to provide communication services to tenants of the facility 102 using the WMNDs 130. Operation of these systems is discussed next with regard to FIG. 2.

Figure 2:
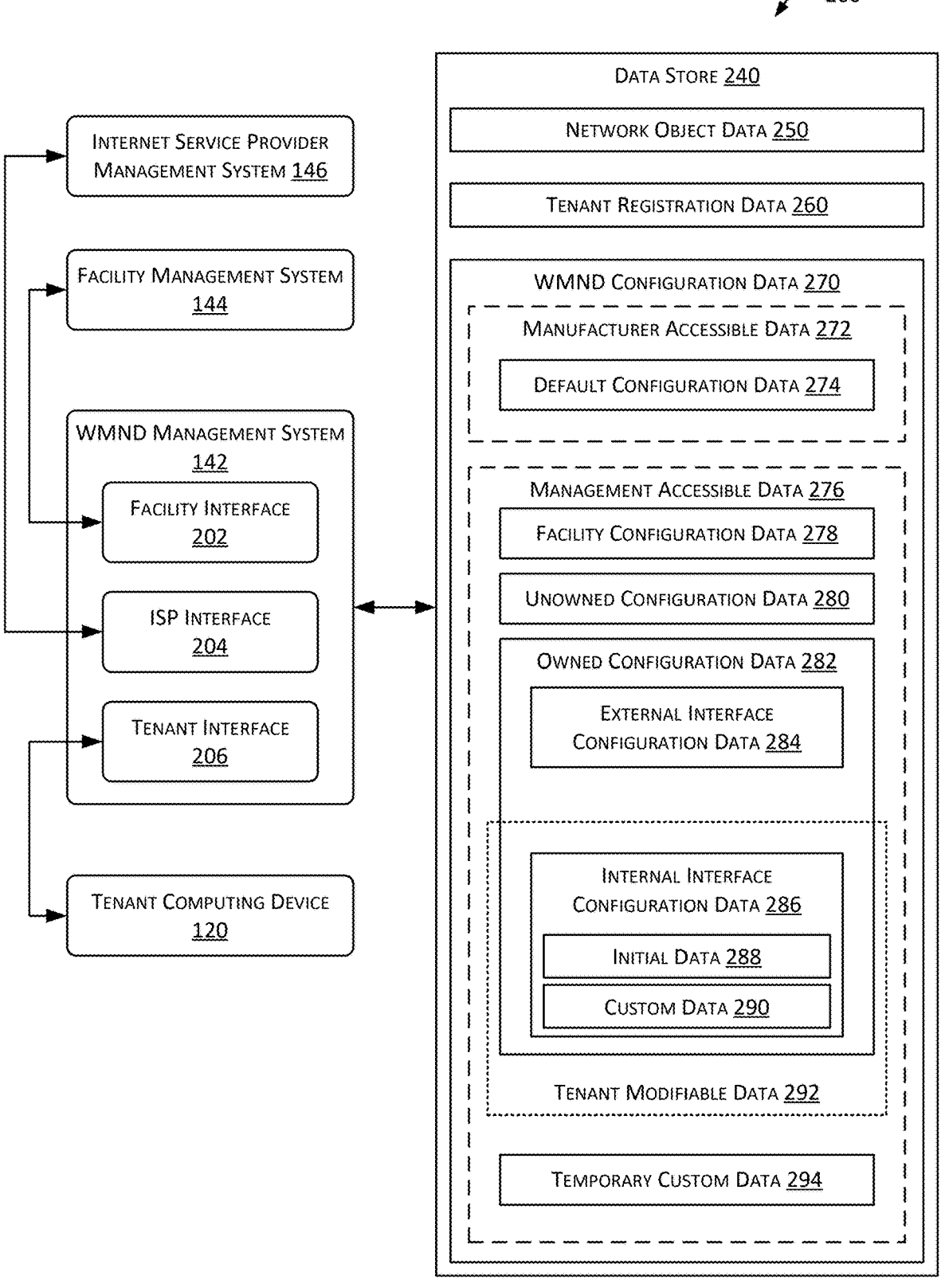
FIG. 2 is a block diagram of portions of the system and configurations for the WMNDs, according to some implementations.

FIG. 2 is a block diagram 200 of portions of the system 100 and configurations for the WMNDs 130, according to some implementations.

The WMND management system 142 may include one or more of a facility interface 202, an ISP interface 204, or a tenant interface 206. These interfaces may comprise one or more of application programming interfaces (API), presentation of user interfaces, and so forth. The interfaces may be used to send messages or other data between systems. The data sent between the systems may be authenticated, encrypted, or otherwise secured.

The facility interface 202 provides for an exchange of data between the facility management system 144 and the WMND management system 142. For example, the facility management system 144 may send the WMND management system 142 a service change request associated with a particular tenant to initiate communication service as of a move-in date, remove service as of a move-out date, and so forth.

The ISP interface 204 provides for an exchange of data between the ISP management system 146 and the WMND management system 142. For example, the WMND management system 142 may send a message to the ISP management system 146 indicative of a particular tenant to provide internet access as of a move-in date, remove internet access as of a move-out date, and so forth.

The tenant interface 206 provides for an exchange of data between a tenant computing device 120 and the WMND management system 142. For example, the tenant interface 206 may send to the tenant computing device 120 data that provides a user interface for the tenant to input information such as move-in date, contact information, billing details, and so forth.

One or more of these systems may utilize one or more data stores 240 to store information associated with operation of the system 100. A single data store 240 is depicted for ease of illustration, and not necessarily as a limitation. The data store 240 may comprise information that is stored on one more computing devices. For example, the data store 240 may comprise a secure cloud storage service.

The data store 240 may store one or more of network object data 250, tenant registration data 260, or WMND configuration data 270. The network object data 250 provides information about the communication service to be provided to a particular tenant at a particular portion 104 of the facility 102. The network object data 250 is discussed in more detail with regard to FIG. 3.

The tenant registration data 260 comprises information about the tenant. For example, the tenant registration data 260 may comprise a billing address, payment method, and so forth. The tenant registration data 260 is discussed in more detail with regard to FIG. 3.

The data store 240 may comprise WMND configuration data 270. The WMND configuration data 270 embodies the configurations 134 that may be operated on one or more of the WMNDs 130. The WMND management system 142 may use the WMND configuration data 270 to configure and operate WMNDs 130. For example, the WMND management system 142 may retrieve configuration data from the data store 240, establish a secure connection with the WMND 130, send the configuration data to the WMND 130, and then provide the WMND 130 with instructions as to when the configuration is to be operated, changing the behavior of the WMND 130.

The WMND configuration data 270 may be divided into one or more of several different sets of data: manufacturer accessible data 272, management accessible data 276, tenant modifiable data 292, or temporary custom data 294.

The manufacturer accessible data 272 comprises the configuration 134 that is specified by the manufacturer. For example, the manufacturer accessible data 272 may comprise default configuration data 274 that represents default settings for the WMND 130 that are present after initial startup or after a hard reset of the WMND 130.

The management accessible data 276 comprises the configuration 134 that may be created by, modified by, or deleted by one or more of systems with designated access permissions. For example, one or more of the ISP management system 146 or the facility management system 144 may be permitted to create, modify, or delete the management accessible data 276. The management accessible data 276 may comprise one or more of facility configuration data 278, unowned configuration data 280, or owned configuration data 282.

The facility configuration data 278 may comprise the configuration 134 that is associated with operation of a set of WMNDs 130 that are located at the facility 102. For example, the facility configuration data 278 may represent a configuration 134 for the WMND 130 that, when operated by the WMND 130, provides the IOT wireless network used by the network enabled devices 132 of the facility, network settings such as gateway route and domain name server (DNS) servers used to access the internet, designation of which WMNDs 130 are associated with a particular portion 104 of the facility 102, and so forth.

The unowned configuration data 280 may comprise the configuration 134 that is associated with operation of a subset of the WMNDs 130 at the facility 102 that are associated with a particular portion 104 of the facility 102 that is unoccupied by a tenant. For example, the unowned configuration data 280 may represent a configuration 134 for the WMND 130 that, when operated by the WMND 130, provides a second wireless network that provides guest network access. The guest network access may be limited to access to a specified server, domain name, and so forth. The unowned configuration data 280 may be used to configure the WMNDs 130 that are associated with portions 104 of the facility 102 that are untenanted. For example, the WMNDs 130 installed in an empty apartment may be configured with the unowned configuration data 280.

The owned configuration data 282 may comprise the configuration 134 that is associated with operation of a subset of the WMNDs 130 at the facility 102 that are associated with a particular portion 104 of the facility 102 that is occupied by a tenant. The owned configuration data 282 may be divided into one or more of several different sets of data: external interface configuration data 284 and internal interface configuration data 286.

The external interface configuration data 284 may comprise the configuration 134 that specifies configuration of an external interface(s) of the WMND 130, such as the interface that communicates with other WMNDs 130, a local router, and so forth. In some implementations, at least a portion of the external interface configuration data 284 may be determined by, or received from via an interface, one or more of the WMND management system 142, the facility management system 144, or the ISP management system 146. In some implementations, the external interface may comprise discrete hardware such as a radio transceiver operating within a specified frequency band, wired Ethernet interface, and so forth. In other implementations the external interface may be virtual, such as sharing a physical interface such as a radio transceiver, with the internal interface.

In some implementations the external interface configuration data 284 may include information such as cryptographic credentials or other information that are used by the ISP to determine if service is to be provided. For example, the external interface configuration data 284 may comprise an ISP username and password that are used by the ISP.

The internal interface configuration data 286 may comprise the configuration 134 that specifies configuration of an internal interface(s) of the WMND 130. For example, the internal interface configuration data 286 may specify one or more of an SSID, password, communication protocol, transmit power setting, beacon interval setting, network address range information, subnet information, gateway network address, DNS server address, and so forth.

The internal interface configuration data 286 may be further divided into initial data 288 and custom data 290. The initial data 288 may specify an initial configuration 134 for the internal interface, such as specified by the WMND management system 142, facility management system 144, or the ISP management system 146. For example, the initial data 288 may comprise an initial SSID, WiFi password, and so forth that a tenant may use to gain initial access to the WMNDs 130 that are associated with their portion 104 of the facility 102.

The custom configuration data 290 may comprise subsequent changes to the initial configuration 134 such as a custom SSID, password, firewall settings, parental control settings, and so forth. For example, a tenant may use a tenant computing device 120 to access the WMND management system 142 via the tenant interface 206 to modify or replace the initial data 288 and configure the communication service according to their needs. Examples of the tenant user interface are described with regard to FIGS. 5A-5C.

Also depicted is the portion of the WMND configuration data 270 that is tenant modifiable data 292. The tenant modifiable data 292 may comprise the internal interface configuration data 286. For example, a tenant may use the tenant computing device 120 to access the tenant interface 206 and make changes to the configuration 134 that is associated with providing the tenant's communication services. However, the tenant does not have permission to view or change the other configurations 134 that may be operated on the WMNDs 130. Continuing the earlier example of FIG. 1, the tenant may be able to set their wireless network to a particular SSID and password, but would not be able to change the "IOT_Bldg1" wireless network that provides communication service to the network enabled devices 132. In contrast, the tenant may be unable to access or modify the manufacturer accessible data 272, facility configuration data 278, unowned configuration data 280, or external interface configuration data 284.

In some implementations, when communication service is discontinued, at least a portion of the internal interface configuration data 286 and other information associated with the tenant may be retained for a specified time interval. For example, the custom data 290 may be retained as temporary custom data 294 for two days after the move-out date. By retaining the temporary custom data 294, the system 100 may quickly restore communication service if needed, such as if the tenant decides to extend their tenancy beyond the scheduled move-out date. In some implementations the tenant may utilize the temporary custom data 294 to provision service at another location. For example, if the tenant is moving from the first portion 104(1) to a fifth portion 104(5), one or more of the custom data 290 or the temporary custom data 294 may be used as the internal interface configuration data 286 that is associated with the fifth portion 104(5). As a result, as the tenant moves into the fifth portion 104(5), their communication services are already configured as they were for the first portion 104(1), eliminating the need for configuration changes by the tenant. In another example, if the tenant is moving from a first facility 102(1) to a second facility 102(2), one or more of the custom data 290 or the temporary custom data 294 may be used as the internal interface configuration data 286 that is associated with the tenant's portion 104 at the second facility 102(2).

In some implementations, in addition to the temporary custom data 294, other information such as one or more of the network object data 250 or the tenant registration data 260, may be temporarily stored as well after communication service is discontinued. As described above, this may be used to facilitate re-establishment of communication services if needed.

FIG. 3 illustrates at 300 data associated with operation of the system, according to some implementations.

The network object data 250 provides information about the communication service to be provided to a particular tenant at a particular portion 104 of the facility 102. The network object data 250 may comprise one or more attributes 302. For clarity of illustration, a description 304 is also shown. The attributes 302 may include one or more of a network identifier (ID) that specifies a particular network, an activation date upon which communication service is to commence, a deactivation date as to when that service ceases, and so forth. The network object data 250 may also include attributes 302 including a portion identifier indicative of the portion 104 of the facility 102, WMND device identifiers associated with the portion 104, and so forth.

In some implementations, a network object as embodied by the network object data 250 may, during operation of the system, transition between different modes. In some implementations, one or more actions may be performed responsive to a transition to a particular mode. For example, an email, short message service, notification, or other information may be sent to the tenant computing device 120 before or after a mode transition.

Depicted in this figure is network object mode data 310 indicative of some of these possible modes. A newly created network object may be in the "pending activation" mode from creation until the activation date is reached. The network object transitions to the "pending transfer" mode when the activation date is reached. An email or other message may be sent to the tenant computing device 120 that includes details associated with the provisioning of the communication service. The network object transitions to the "owned" mode upon tenant acceptance of the provisioning. For example, after the tenant uses the tenant computing device 120 to accept terms of service, configure an account with the WMND management system 142, and so forth, the network object transitions to the owned mode. The network object transitions to the "deactivated" mode after communication service concludes. For example, the network object may be transitioned to "deactivated" after a deactivation date (or move-out date) is reached, or upon receiving a message from the ISP management system 146 or the facility management system 144.

The tenant registration data 260 comprises information about the tenant. The tenant registration data 260 may comprise one or more attributes 316. For clarity of illustration, a description 318 is also shown. The attributes 316 may include one or more of a user identifier, billing address, payment method, legal name, and so forth.

For example, the tenant registration data 260 may comprise a billing address, payment method, and so forth.

In some implementations, tenant data may comprise the network object data 250 and the tenant registration data 260.

Figure 4B:
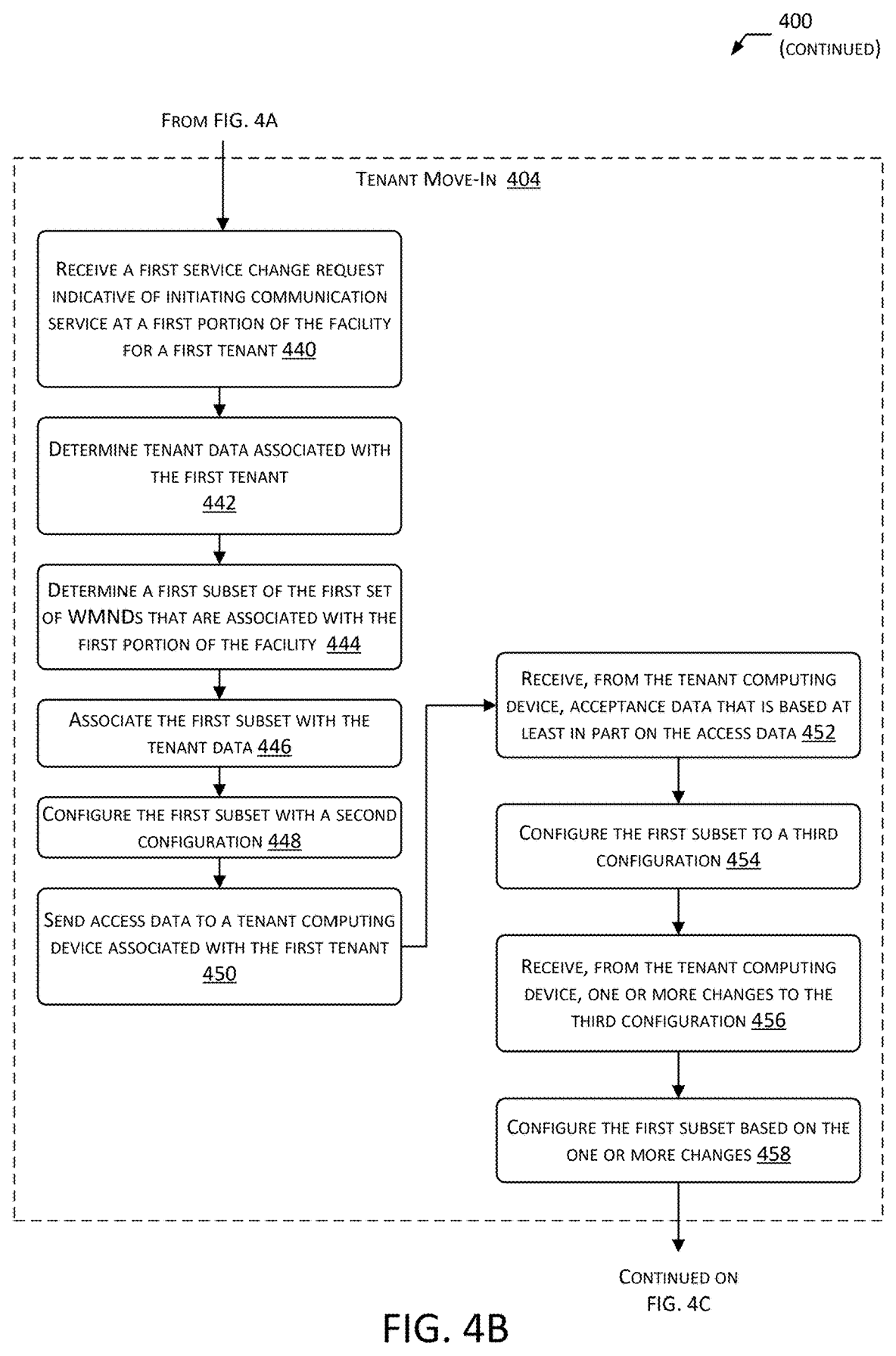

FIGS. 4A-4C illustrate a flow diagram 400 of a process including initial installation 402 (FIG. 4A), tenant move-in 404 (FIG. 4B), and tenant move-out 406 (FIG. 4C) from the facility, according to some implementations. The process may be performed by one or more of the tenant computing device 120, WMND management system 142, the facility management system 144, or the ISP management system 146.

Initial install 402 is depicted comprising operations 420-424.

At 420 a first set of WMNDs 130 are installed at a multi-tenant facility 102. For example, one or more WMNDs 130 may be installed by an installer in one or more portions 104 of the facility 102. The installation may comprise physical installation, and may include initial network configuration to provide the WMNDs 130 with the ability to communicate with the network 140, and the WMND management system 142.

At 422 the first set of WMNDs 130 are registered with the WMND management system 142. For example, the registration may include the WMND 130 and the WMND management system 142 establishing cryptographic credentials to facilitate secure transfer of configuration data, log data, and so forth.

At 424 the first set of WMNDs 130 are configured with a first configuration 134(1). For example, the WMND management system 142 may send the facility configuration data 278 to the first set of WMNDs 130, and operate the first set of WMNDs 130 based on the facility configuration data 278. Continuing this example, the facility configuration data 278 may provide the IOT network for use by the network enabled device 132.

Tenant move-in 404 is depicted comprising operations 440-458.

At 440 a first service change request is received. The first service change request may be indicative of initiating communication service at a first portion 104 of the facility 102 for a first tenant. In one implementation, the first service change request may be sent by the facility management system 144 to the WMND management system 142. For example, after a new tenant completes signing their lease to rent apartment 1, the facility management system 144 may send the first service change request to the WMND management system 142.

At 442 tenant data associated with the first tenant is determined. For example, the tenant data may comprise one or more of the network object data 250, tenant registration data 260, and so forth. In one implementation, the tenant may use the tenant computing device 120 to provide information such as name, contact information, payment method, and so forth. In one implementation at least a portion of the tenant data may be determined based on information acquired during operation of the facility management system 144. For example, during a workflow in which the tenant is renting an apartment, the facility management system 144 may send information indicative of the apartment number, move-in date, contact information, and so forth to the WMND management system 142.

At 444 a first subset of the first set of WMNDs 130 is determined that are associated with the first portion 104 of the facility 102. Continuing the previous example, the WMND management system 142 may use the apartment number to retrieve the list of WMNDs 130 that are located within the apartment.

At 446 the first subset is associated with the tenant data. For example, the network object data 250 may be modified to include device serial numbers of the WMNDs 130 in the apartment.

At 448 the first subset is configured with a second configuration 134(2). For example, the WMND management system 142 may send the unowned configuration data 282 to the WMNDs 130 in the apartment and operate those WMNDs 130 to operate according to the configuration data. In one implementation, the second configuration 134(2) may provide "guest" or unauthenticated access that is limited. For example, the second configuration 134(2) may be specific to the facility 102 or to a specific portion 104, and may provide network access to one or more specified network addresses, or "captive portals" allowing the tenant to complete the setup of the communication service. In another implementation, the second configuration 134(2) may provide slightly more restrictive access, such as requiring entry of a passcode or access code before allowing connection to one or more specified network addresses.

In such implementations, a message indicative of one or more parameters associated with the second configuration 134(2) may be sent to a device associated with the tenant, such as the tenant computing device 120. For example, the second configuration 134(2) may establish a guest network that does not broadcast an SSID, requires a password to connect, and so forth. The message may include these parameters, allowing the tenant to connect using the second configuration 134(2).

At 450 access data is sent to a tenant computing device 120 that is associated with the first tenant. The access data is associated with providing access to a network. For example, a new service setup email may be sent to an email address that is associated with the tenant. The new service setup email may include access data comprising an access code, uniform resource locator (URL), or other data that is used by the tenant to initiate the communication service in the portion 104 of the facility 102.

At 452 acceptance data is received from the tenant computing device 120. The acceptance data is based at least in part on the access data. The acceptance data may be used to confirm that the tenant has elected to proceed with setting up the communication service. For example, the acceptance data may comprise the access code, data from an authenticator application or device, and so forth. Continuing the example, if the acceptance data corresponds to the access data that was provided to the tenant computing device 120, that may be deemed to authenticate the tenant or their representative who may proceed with setting up the communication service.

At 454 the first subset of WMNDs 130 is configured to a third configuration 134(3). For example, the WMND management system 142 may send the owned configuration data 282 to the WMNDs 130 in the apartment and operate those WMNDs 130 to operate according to the configuration data.

In some implementations the tenant may wish to customize their network configuration. As described above, the tenant may modify tenant modifiable data 292, such as the internal interface configuration data 286 to add custom data 290.

At 456 one or more changes to the third configuration 134(3) are received from the tenant computing device 120. For example, the tenant may use the tenant computing device 120 to access the WMND management system 142 via the tenant interface 206 and change the internal interface configuration data 286.

At 458 the first subset of WMNDs 130 is configured based on the one or more changes. For example, the WMND management system 142 may send the custom data 290 to the WMNDs 130 in the apartment and operate those WMNDs 130 to operate according to the configuration data.

Tenant move-out 406 is depicted comprising operations 470-480.

At 470 a second service change request is received. The second service change request may be indicative of removing communication service currently being provided at the first portion 104 of the facility 102 for the first tenant. In one implementation, the second service change request may be sent by the facility management system 144 to the WMND management system 142. For example, based on the current date being on or after the last day of occupancy for apartment 1, the facility management system 144 may send the second service change request to the WMND management system 142.

At 472 the first subset of the first set of WMNDs 130 is determined that are associated with the first portion 104 of the facility 102. Continuing the earlier example, the WMND management system 142 may use the apartment number to retrieve the list of WMNDs 130 that are located within the apartment.

At 474 a current configuration 134 of the first subset that is associated with the first tenant is determined. For example, the internal interface configuration data 286, or a portion thereof such as the custom data 290, that is associated with the first subset is retrieved.

At 476 the current configuration 134 is designated for temporary storage. For example, the internal interface configuration data 286, or a portion thereof such as the custom data 290, that is associated with the first subset may be flagged for temporary storage, stored as temporary custom data 294, and so forth. Data in temporary storage may be deleted upon explicit request or after a threshold time interval has elapsed, as described at 480.

At 478 the first subset is configured to a fourth configuration 134(4). For example, the WMND management system 142 may remove the third configuration 134(3), such as the internal interface configuration data 286 associated with the first tenant, and may configure the first subset with the unowned configuration data 280.

At 480 one or more of the tenant data, the third configuration 134(3), or the current configuration 134 are deleted. For example, the temporary custom data 294 may be deleted upon request or after the threshold time interval has elapsed.

Figure 5A:
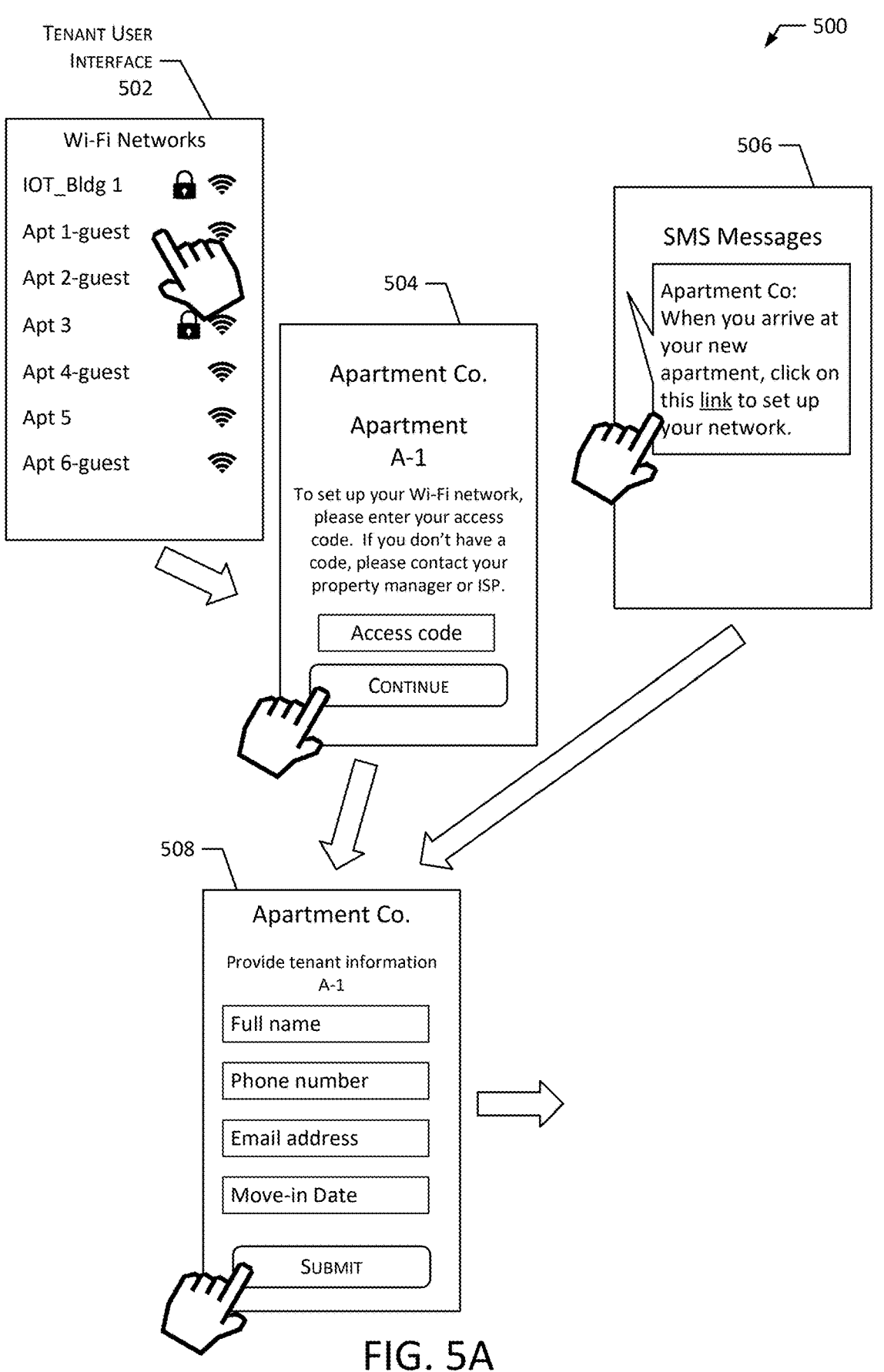

FIGS. 5A-5C depict at 500 tenant user interfaces for various operations associated with setting up communication service within a portion 104 of the facility 102, according to some implementations. These user interfaces are depicted corresponding to a scenario in which the tenant is setting up communication service associated with the first portion 104(1) designated as "Apartment 1" or "Apt 1".

At 500 graphical user interfaces are depicted. The graphical user interface may be presented by the tenant computing device 120. In other implementations, other types of user interfaces may be used. For example, a verbal user interface may use synthesized speech to present information to the tenant and use speech recognition to acquire input from the tenant.

The user interfaces presented in this disclosure, and their respective sequence, are provided by way of illustration and not necessarily as a limitation. In some implementations one or more of the user interfaces may be omitted, consolidated, or otherwise modified to provide the functionality described herein.

For ease of discussion in the following figures, unless otherwise specified, a "network" may comprise a particular wireless LAN that is identified by a particular SSID.

A user interface 502 depicts an initial set of WiFi networks, each with a different SSID, provided at the facility 102. In this illustration, the SSIDs include "IOT_Bldg1", "Apt 1-guest", "Apt 2-guest", "Apt 3", and so forth.

As described above with regard to 452, the tenant provides acceptance data to the system 100 to access the network. At 504 the user interface requests the tenant input their access code, such as contained in the new setup email, to provide the acceptance data.

Alternatively at 506 a short message service (SMS) message has been sent that includes a link. Activation of the link may then provide the acceptance data.

A user interface 508 requests the tenant provide information. For example, the tenant may enter one or more values for attributes of the network object data 250, tenant registration data 260, and so forth. In some implementations this may provide initial acquisition of this data for use by the system 100. In other implementations, at least a portion of the information acquired by the user interface 508 may be compared to previously acquired data for other purposes, such as to facilitate authorization to proceed.

A user interface 540 provides the tenant with the opportunity to set up an account with the WMND management system 142. In some implementations this user interface 540 and associated operations may be omitted and consolidated. For example, single sign on credentials may be used and a single presentation of terms of service to provide for setup of accounts with regard to the individual systems, such as the WMND management system 142, the facility management system 144, and the ISP management system 146.

A user interface 542 is shown after an account for the tenant has been set up with the WMND management system 142. In this user interface 542, the tenant is provided with at least a portion of the initial data 288, such as a default WiFi network name (or SSID), network password, and so forth. Also provides is a control that when activated opens the management application ("app"). The management app may utilize the tenant interface 206 to allow the tenant to interact with the WMND management system 142.

A user interface 562 allows the tenant to modify the internal interface configuration data 286. For example, the tenant is able to change the WiFi network name (or SSID), network password, or use other controls to modify other settings.

In some implementations the WMND management system 142 may perform one or more checks before committing a change. For example, the WMND management system 142 may prevent the use of identical SSIDs at the same facility 102, or within some distance of an existing user. In another example, the WMND management system 142 may prevent the use of similar SSIDS, to avoid confusion or spoofing. In such an instance, the user interface 562 may be used to present the user with a message about the collision, suggest alternatives, and so forth.

A user interface 564 depicts the user interface after the tenant has changed the WiFi network name (or SSID) and password. Other user interfaces available include an "advanced settings" user interface (not shown). The advanced settings may be used to configure local area network address information such as gateway address, dynamic host configuration protocol (DHCP) address pool, subnet mask, and so forth.

A user interface 566 allows the tenant to modify firewall and other settings. For example, the user interface 566 allows the user to set parental controls, configure port forwarding, configure application settings, and so forth.

A user interface 568 allows the tenant to view the various WMNDs 130 that are associated with their portion 104 of the facility 102. The user interface 568 may also provide a control to restart one or more of those WMNDs 130. In some situations, the tenant may bring their own WMNDs 130. A control to "edit own devices" allows the tenant to add their own personal WMNDs 130 to the system 100. Upon move out, these tenant-provided WMNDs 130 may be physically removed by the tenant, and service provided by the system 100 that is associated with the facility 102 may be removed.

As mentioned above, changes made within the user interfaces provided to the tenant may be limited to tenant modifiable data 292. Other configuration data is not accessible to the tenant. As a result, the tenant is unable to make changes to other WLAN networks provided by the same WMNDs 130, such as the "IOT_Bldg1" network.

FIG. 6 depicts a facility management user interface 600 of the system 100, according to one implementation. The facility management user interface 600 may be provided by one or more of the facility management system 144 or the WMND management system 142.

The facility management user interface 600 in this illustration depicts a header section 602 and a detail section 604. The header section 602 provides information about the overall facility 102. For example, the total number of networks (SSIDs) provided by the WMNDs 130 of the facility 102 are shown. In this example, the apartments are new, and so there are currently 600 vacant networks (in the "unowned" configuration 134), 10 networks with unverified owners in which the tenant has yet to complete setup, and 10 networks with verified owners.

The detail section 604 provides additional information and controls associated with the various networks (SSIDs). For example, the network names, apartment number, description, network owner status, connection status, move-in date, and access code are depicted. The controls available within the detail section 604 allow the change in network owner status. For example, the facility manager may use the facility management user interface 600 to "assign" the network and corresponding WMNDs 130 corresponding with a portion 104 of the facility 102 to a tenant, or "change" that such as setting a move-out date to discontinue communication service.

In this illustration, the access codes are provided. As described above with regard to 450, the access code may be used for a tenant to gain initial access to the network 140. In some implementations the access codes may be changed on a regular or irregular schedule. Once the network has been owned, no access code is provided.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EE-PROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more memories storing computer-executable instructions; and
one or more processors to execute the computer-executable instructions to:
configure, with a first configuration, a first set of wireless mesh network devices (WMNDs) that are associated with a multi-tenant facility ("facility");
receive a first request indicative of providing internet service at a first portion of the facility, wherein the internet service is associated with a first tenant;
determine tenant data associated with the first tenant;
determine a first subset of the first set of WMNDs that are associated with the first portion of the facility;
associate the first subset with the tenant data;
configure the first subset with a second configuration;
send access data to a tenant computing device that is associated with the first tenant, wherein the access data is associated with providing access to a network;
receive, from the tenant computing device, acceptance data that is based at least in part on the access data, wherein the acceptance data is indicative of the first tenant electing to proceed with setup of the internet service; and
configure the first subset to a third configuration.

2. The system of claim 1, the one or more processors further execute the computer-executable instructions to:
receive, from the tenant computing device, a change to the third configuration;
configure the first subset based on the change to the third configuration; and
operate the first subset based on the first configuration and the change to the third configuration.

3. The system of claim 1, the one or more processors further execute the computer-executable instructions to:
operate, based on the first configuration, the first set of WMNDs to transmit a first wireless service set identifier (SSID); and
operate, based on the third configuration, the first subset to transmit a second wireless SSID that differs from the first SSID.

4. The system of claim 1, the one or more processors further execute the computer-executable instructions to:
determine, based on the tenant data associated with the first tenant, a fourth configuration associated with one or more of a second facility or a second portion of the facility; and
determine the third configuration based at least in part on the fourth configuration.

5. The system of claim 1, the one or more processors further execute the computer-executable instructions to:
determine, responsive to the first request, a first message indicative of one or more parameters associated with the second configuration; and
send the first message to the tenant computing device.

6. The system of claim 1, the one or more processors further execute the computer-executable instructions to:
receive a second request indicative of removing the internet service at the first portion of the facility, wherein the internet service is associated with the first tenant; and
remove the third configuration from the first subset.

7. The system of claim 1, the one or more processors further execute the computer-executable instructions to:
receive a second request indicative of removing the internet service at the first portion of the facility, wherein the internet service is associated with the first tenant;
store the third configuration for a first time interval; and
delete one or more of the tenant data or the third configuration after expiration of the first time interval.

8. A computer-implemented method, the method comprising:
configuring, with a first configuration, a first set of wireless mesh network devices (WMNDs) that are associated with a facility;
receiving a first request indicative of initiating internet service at a first portion of the facility, wherein the internet service is associated with a first tenant;
determining tenant data associated with the first tenant;
determining a first subset of the first set of wireless mesh network devices (WMNDs) that are associated with the first portion of the facility;
associating the first subset with the tenant data;
configuring the first subset with a second configuration;
sending access data to a tenant computing device that is associated with the first tenant, wherein the access data is associated with providing access to a network;

receiving acceptance data that is based at least in part on the access data, wherein the acceptance data is indicative of the first tenant electing to proceed with internet service; and configuring the first subset to a third configuration.

9. The method of claim 8, further comprising:

receiving, from a device associated with the first tenant, a change to the third configuration;

configuring the first subset based on the change to the third configuration; and operating the first subset based on the first configuration and the third configuration.

10. The method of claim 8, further comprising:

operating, based on the first configuration, the first set of WMNDs to transmit a first service set identifier (SSID); and operating, based on the third configuration, the first subset to transmit a second SSID that differs from the first SSID.

11. The method of claim 8, further comprising:

determining, based on the tenant data associated with the first tenant, a fourth configuration associated with one or more of a second facility or a second portion of the facility; and determining the third configuration based at least in part on the fourth configuration.

12. The method of claim 8, further comprising:

determining, responsive to the first request, a first message indicative of one or more parameters associated with the second configuration; and sending the first message to the tenant computing device.

13. The method of claim 8, further comprising:

receiving a second request indicative of removing the internet service at the first portion of the facility, wherein the internet service is associated with the first tenant; and removing the third configuration from the first subset.

14. The method of claim 8, further comprising:

receiving a second request indicative of removing the internet service at the first portion of the facility, wherein the internet service is associated with the first tenant;

storing the third configuration for a first time interval; and deleting one or more of the tenant data or the third configuration after expiration of the first time interval.

15. A system comprising:

one or more memories storing computer-executable instructions; and one or more processors to execute the computer-executable instructions to:

operate, with a first configuration, a first set of wireless mesh network devices (WMNDs) that are installed at a facility;

receive a first request that is associated with a first portion of the facility;

determine a first subset of the first set of WMNDs that are associated with the first portion of the facility;

operate the first subset with a second configuration;

receive acceptance data that is associated with the first portion of the facility; and operate, with a third configuration, the first subset of the first set of WMNDs.

16. The system of claim 15, the one or more processors further execute the computer-executable instructions to:

receive a change to the third configuration;

configure the first subset based on the change to the third configuration; and operate the first subset based on the first configuration and the third configuration.

17. The system of claim 15, the one or more processors further execute the computer-executable instructions to:

based on the first configuration, transmit a first service set identifier (SSID) from at least a portion of the first set of WMNDs; and based on the third configuration, transmit a SSID from the first subset, wherein the second SSID differs from the first SSID.

18. The system of claim 15, the one or more processors further execute the computer-executable instructions to:

determine a fourth configuration associated with one or more of a second facility or a second portion of the facility; and determine the third configuration based at least in part on the fourth configuration.

19. The system of claim 15, the one or more processors further execute the computer-executable instructions to:

determine, responsive to the first request, a first message indicative of one or more parameters associated with the second configuration; and send the first message to a computing device that is associated with the first portion of the facility.

20. The system of claim 15, the one or more processors further execute the computer-executable instructions to:

receive a second request indicative of removing the third configuration from the first subset;

remove the third configuration from the first subset of the first set of WMNDs;

operate the first subset with the first configuration and the second configuration; and delete the third configuration.

* * * * *